United States Patent [19]

Widerman

[11] Patent Number: 4,844,654
[45] Date of Patent: Jul. 4, 1989

[54] BEACH EROSION REVERSAL SYSTEM AND METHOD

[76] Inventor: Mark Widerman, 21 Sloop Dr., Cocoa Beach, Fla. 32931

[21] Appl. No.: 238,736

[22] Filed: Aug. 31, 1988

[51] Int. Cl.$^4$ .............................................. E02B 3/06
[52] U.S. Cl. ...................................... 405/25; 405/21; 405/26
[58] Field of Search ....................... 405/15, 21, 25, 26, 405/35, 29-31, 34

[56] References Cited

U.S. PATENT DOCUMENTS 4,006,598  2/1977  Hulsemann ............................ 405/25
4,264,233  4/1981  McCambridge ...................... 405/26

OTHER PUBLICATIONS

"The Amateur Scientist"—Author C. L. Strong, Scientific American, Oct. 1986, pp. 116-125.

Primary Examiner—David H. Corbin
Attorney, Agent, or Firm—Charles J. Prescott

[57] ABSTRACT

A beach erosion reversal system adapted to assist in reforming cresting destructive waves into substantially constructively beach-replenishing waves. The preferred system comprises a plurality of solid members deployable by offshore submersion along a beach, preferably along the line of wave crest formation. The composition of the solid members are such that wave action wears the structures away in a predetermined relatively short period of time. Another embodiment includes a plurality of buoys held in place along the wave crest line by submerged connected weights. The wave alteration into substantially constructive wave formations is similar. Variations of size, shape, lateral spacing and composition are also provided.

9 Claims, 2 Drawing Sheets

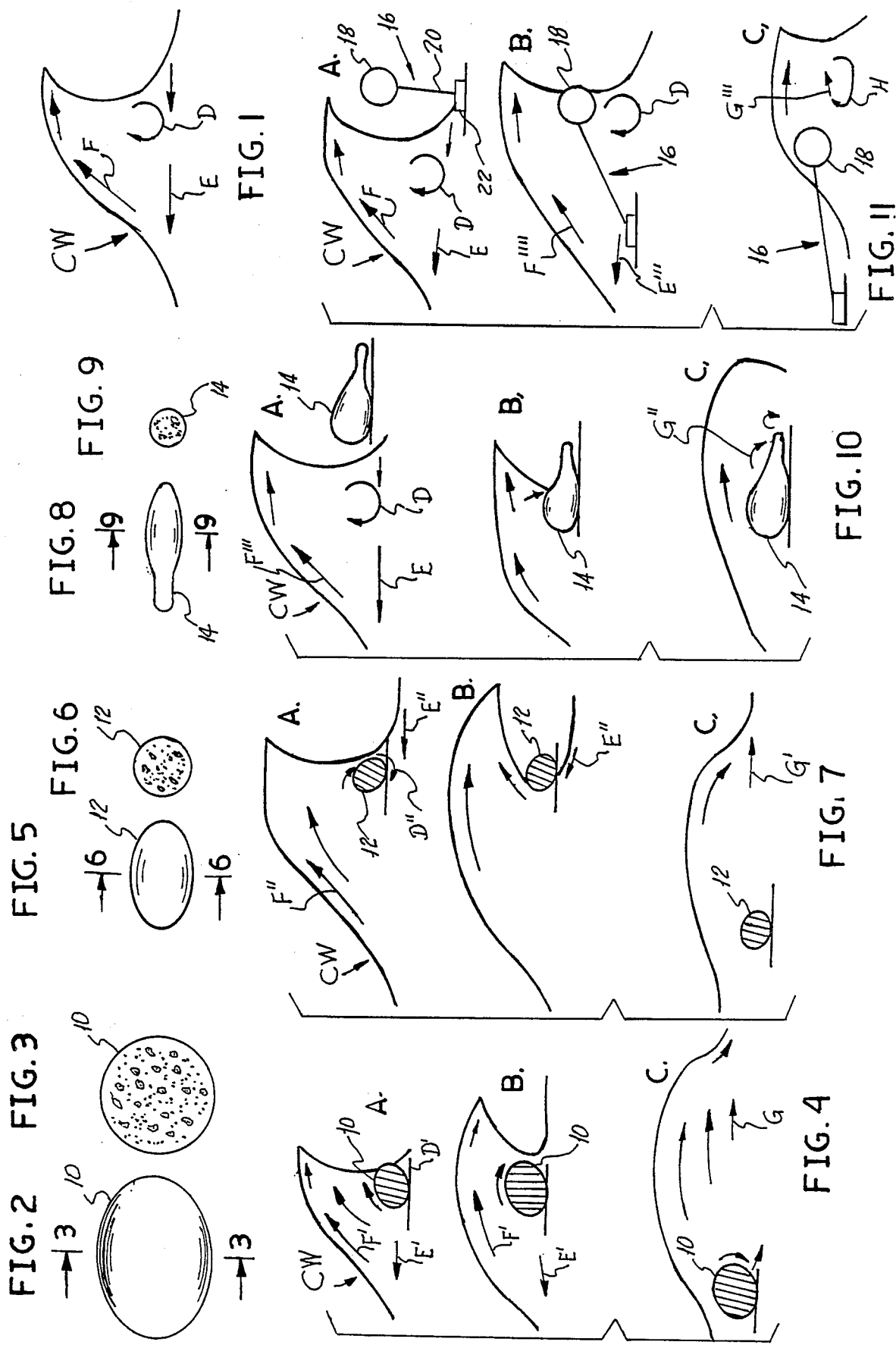

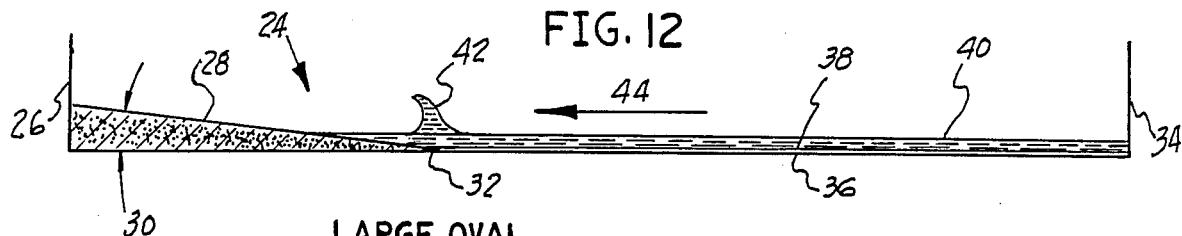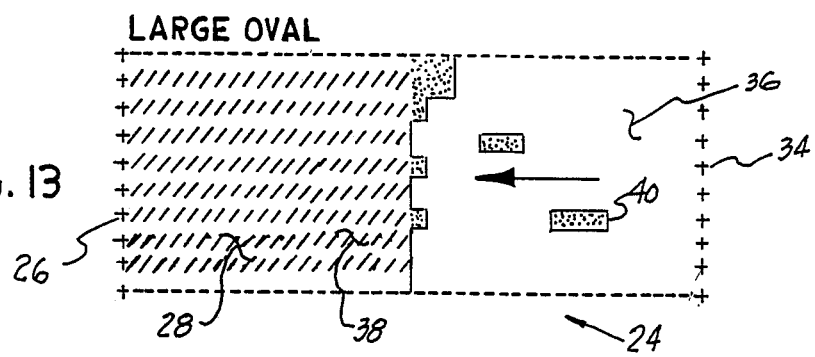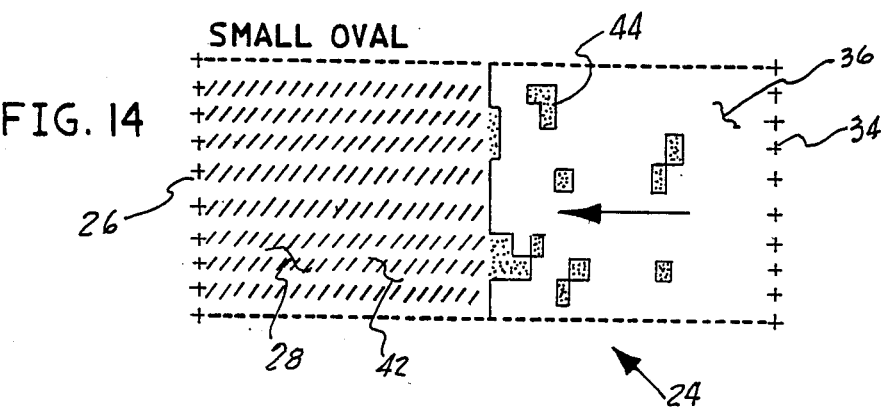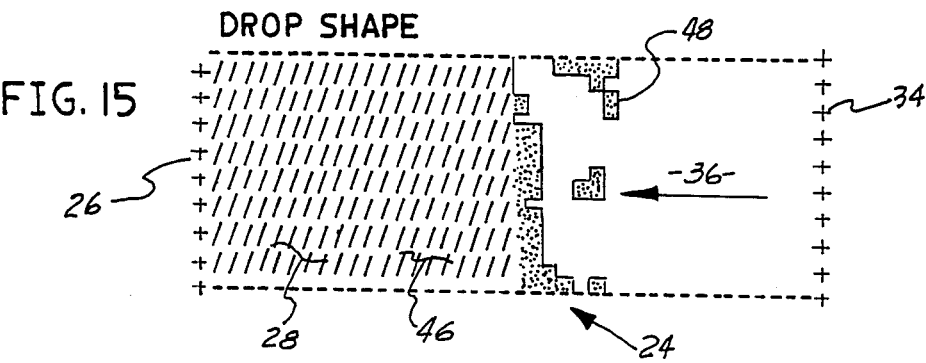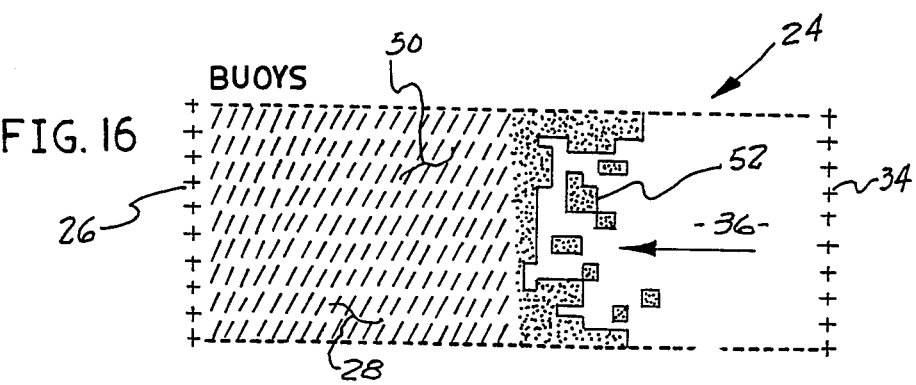

4,844,654

BEACH EROSION REVERSAL SYSTEM AND METHOD

BACKGROUND OF THE INVENTION

This invention relates generally to means for preserving beaches, and limiting beach erosion and replenishing beach sand, and more particularly to a beach erosion reversal system and method.

During periods of high winds and waves, particularly during winter months and periods of storms coupled with high tides, the waves which break upon beaches are referred to as destructive waves. These destructive waves crest resulting in repeated periods of strong undertow or wave recirculation out to sea which act upon the beach sand carrying it away from the beach in a conveyor belt-like action that pulls the sand into the ocean. The most extensive research has shown that, on an average, the United States' coastlines are being eroded at the rate of 30 centimeters per year.

During periods when winds are calm, waves do not crest and the substantially smaller circulation within each wave allows this conveyor belt-type action to work constructively, carrying sand up onto the beach for deposit there. These waves are known as constructive waves which act to rebuild the beach area.

Because of the increasing presence of sea walls, groins, and buildings which have been constructed ever closer to beach areas, this conveyor belt-like action of the constructive summer waves has been substantially blocked. Indeed, destructive winter waves are successfully stopped from reaching buildings. However, these sea walls also stop the constructive summer or gentle wave action as well. The sea wall not only stops the constructive waves but it also spreads the sand which has been collected within constructive waves throughout the water. Thereafter, the sand is simply returned to the sea having been thwarted in its beach healing effort. Thus, all waves approaching such developed beach areas result in some form of destruction or beach erosion because the normal wave action of otherwise constructive waves is interrupted by these near-beach structures.

Perhaps the only effective way which modern man has found to cope with this beach erosion problem is to simply redeposit masses of sand onto the beach after nature has done its destructive work.

Researchers in the field of beach erosion and preservation have determined that the most productive process apparently available is "beach renourishment", i.e. the hauling of new sand onto the beach. This process, however, enables destructive waves to pull even larger amounts of loose material, as well as much of the new sand, away from the beach. Thus, the productive and expensive benefits of this beach renourishment could be washed away in a short period of time and typically are.

Of course, a major drawback of this regeneration or renourishment process for beaches is the massiveness of the cost of either trucking in sand from inland, or using massive dredges to deposit fresh sand atop the eroded beach area. Another major short fall of this renourishment process lies in the available timing for placement of this new sand atop these beaches. Summer waves that build the beaches require this gentle flow pattern in order to remain constructive. If renourishment is performed in the summer, these waves will be interrupted, thus causing erosion on the original sand and undermining the renourished sand. Further, the techniques now available for spreading sand with earth movers typically result in the formation of a ledge at the far reach of these earth movers. This sudden drop forming the ledge acts as a temporary seawall itself, blocking both constructive and destructive waves. The original sand is undermined preparing the beach for drastic erosion during the next destructive wave period.

The present invention is intended to provide a full scale structural system and method which may be deposited and used along an eroded beach reversing much of the effects of erosion by constructively altering the flow of water in destructive waves. The structures are fabricated of economical materials which are designed to themselves be eroded away by the wave action so as not to result in beach clutter avoiding a "next generation" problem in and of themselves.

BRIEF SUMMARY OF THE INVENTION

This invention is directed to a beach erosion reversal system adapted to assist in reforming cresting destructive waves into substantially constructively beach-replenishing waves. The preferred system comprises a plurality of solid members deployable by offshore submersion along a beach, preferably along the line of wave crest formation. The composition of the solid members are such that wave action and sand abrasion wear or erode the structures away in a predetermined relatively short period of time. Another embodiment includes a plurality of non-sacrificial buoys held in place along the wave crest line by submerged connected weights. The wave alteration into substantially constructive wave formations is similar. Variations of size, shape, lateral spacing and composition of sacrificial embodiments are also provided.

It is therefore an object of this invention to provide a beach erosion reversal system which is easily deployable on the ocean bottom along the beach shoreline.

It is another object of this invention to provide a beach erosion reversal system which, after deployment, will deteriorate in a predetermined length of time so as to avoid beach clutter and burying by continued wave action.

It is another object of this invention to provide a beach erosion reversal system which is adaptable to virtually all wave sizes and may be deployed in the appropriate size based upon anticipated wave action such as preceding hurricanes, high tides, heavy winter storms and the like.

It is another object to provide the above invention which may be easily fabricated of conventional, economical materials and manufacturing techniques.

In accordance with these and other objects which will become apparent hereinafter, the instant invention will now be described with reference to the accompanying drawings in which:

BRIEF DESCRIPTION OF THE DRAWINGS

FIG. 1 is a schematic view of a typical cresting wave showing emperically the internal currents therein.

FIG. 2 is a side elevation view of the preferred embodiment of the invention.

FIG. 3 is a section view in the direction of arrows 3-3 in FIG. 2.

FIG. 4 is a schematic view showing emperically the sequencing and inner action of a typical cresting wave around the embodiment of the invention shown in FIG. 2.

FIG. 5 is a side elevation view of another embodiment of the invention.

FIG. 6 is a section view in the direction of arrows 6-6 in FIG. 5.

FIG. 7 is a schematic view showing emperically the sequencing and inner action of a typical cresting wave around the embodiment of the invention shown in FIG. 5.

FIG. 8 is a side elevation view of another embodiment of the invention.

FIG. 9 is a section view in the direction of arrows 9-9 in FIG. 8.

FIG. 10 is a schematic view showing emperically the sequencing and inner action of a typical cresting wave around the embodiment of the invention shown in FIG. 8.

FIG. 11 is a schematic view showing emperically the sequencing and inner action of a typical cresting wave around the floating or buoyant embodiment of the invention.

FIG. 12 is a side elevation longitudinal section view of the laboratory test facility used to develop the details of the invention.

FIG. 13 is a top plan schematic view of FIG. 12 depicting the test results based upon use of the embodiment of the invention shown in FIG. 2.

FIG. 14 is a top plan schematic view of FIG. 12 depicting the test results based upon use of the embodiment of the invention shown in FIG. 5.

FIG. 15 is a top plan schematic view of FIG. 12 depicting the test results based upon use of the embodiment of the invention shown in FIG. 8.

FIG. 16 is a top plan schematic view of FIG. 12 depicting the test results based upon use of the embodiment of the invention shown in FIG. 11.

DETAILED DESCRIPTION OF THE INVENTION

Referring now to the drawings, and particularly to FIG. 1, the side elevation view of a typical cresting wave CW is there shown. Also there shown are the various directions of water flow within the cresting wave CW, including the forwardly thrusting wave portion F, the circular internal motion D and the outflow or undertow portion E. During periods of destructive cresting wave formation which include these cresting waves CW, it is the combination of clockwise internal circulation D and outflow or undertow current E which produce the destructive effects upon beaches, causing the sand therewithin to be carried in suspension out to sea. Ultimately an offshore sandbar may be formed as a result of this destructive beach action. As an aside, it is in many cases sand from these offshore sandbars which is redeposited back onto the beach during periods of gentle constructive waves.

In preparation for lab experiments, a wave tank was constructed according to Frank Pattee's work as documented in an article by C. I. Stong, "How to Make a Wave Machine to Simulate the Building and Destruction of Beaches", *Scientific American*, October, 1986, pp. 116 125. A side elevation view of the experimental laboratory tank is shown in FIG. 12. During laboratory experiments utilizing this wave machine by Pattee, various shapes and sizes of submerged and buoyant structures were evaluated for their effect upon altering the destructive, cresting wave pattern. Also during these experiments, the alteration of the shape of the cresting wave was observed, with emphasis on empirical evaluation of the alteration of the flow within the altered cresting waves.

The structures found to be effective in producing constructive wave modification to otherwise destructive wave formation are shown in FIGS. 2, 5 8, and 11. The preferred shape embodiment of the invention is shown at numeral 10 in FIGS. 2 and 3. This embodiment 10 is generally of a broad oval side elevation configuration having a generally circular cross section as shown. The altered cresting wave CW formation resulting from the placement of structure 10 submerged on the bottom at the point from the beach where the wave crests is shown in FIG. 4. In FIG. 4A, the internal circulation D' is substantially modified, while the beach erosive outflow E' has been substantially lessened. As seen in FIG. 4B, virtually all of the clockwise circulation within the wave has been eliminated. Then, in FIG. 4C, substantially all of the cresting wave energies are converted to beach-bound flow G which serves to carry sand in suspension toward the beach for deposit in a constructive fashion.

The embodiment of the invention shown at numeral 12 in FIGS. 5 and 6 is similar to that previously described with respect to FIG. 2, except that this embodiment 12 is somewhat smaller in overall size in relation to the height of the cresting wave CW produced in the experimental tank. However, as can be seen in FIGS. 7A, 7B, and 7C, the various components of water flow within the cresting wave CW are similarly modified so as to also produce beneficial sand-depositing water flow G' toward the beach.

Another embodiment of the invention shown generally at numeral 14 in FIGS. 8 and 9, was found to be effective in modifying the destructive effects of the cresting wave CW. However, as may be best seen in FIG. 10C, some of the internal flow G" remains circular, thus reducing the effectiveness of this three-dimensional shape in modifying the destructive effects of cresting waves.

The embodiments of the invention described in FIGS. 2, 5 and 8 are all structured of various mixtures of concrete and sand which will be herebelow described. These embodiments 10, 12 and 14 are intended to be submerged and placed on the bottom in spaced apart fashion along the wave cresting line offshore from the beach.

In the embodiment shown in FIG. 11, an anchored buoy arrangement shown generally at numeral 16 has also been found in laboratory experiments to be effective in modifying the internal water flow of a cresting wave CW. This buoy arrangement 16 includes a spherically shaped Styrofoam buoy 18 connected by a flexible line 20 to a weight 22 submerged on the bottom. The length of cord 20 is selected so as to be at least as long as the depth of water at the point of submerging but not as long as to allow the buoy 18 to reach the top of the cresting wave CW. By this arrangement, although in the initial stage of encounter shown in FIG. 11B between the cresting wave CW and buoy 18, little modification is seen with respect to the internal circulation D, the undertow current E''' is reduced and, as shown in FIG. 11C as substantially the entire cresting wave CW has passed buoy 18, substantially all of the undertow has been eliminated; however, a significant portion of internal circular circulation H remains, thus somewhat reducing the effectiveness of this embodiment 16 of the invention.

EXPERIMENTAL LABORATORY RESULTS

Referring now to FIG. 12, extensive laboratory testing was conducted utilizing the wave tank shown generally at numeral 24. As previously discussed, this tank 24 was constructed in accordance with the previous work of Frank Pattee wherein a wave-generating tank having an overall length of 187 cm was constructed. A wedge of sand 28 was prepared having an angle 30 which was established at approximately 7° and representing the approximate slope of beaches in the Florida area. The simulated beach wedge 28 was constructed of compacted beach sand having an overall length ending at 32 approximately equal to ⅓ of the overall length of the tank 24, or 63 cm. After the compacted wedge 28 was established, a layer of loose sand 28 was placed on the bottom 36 of tank 24 to a depth of approximately 1 cm. Thereafter, water 40 was placed in the tank at a depth of approximately 3 cm. For the purposes of the test results reported herein, a wave height 42 was generated of approximately 7.6 cm for movement from the right end 34 in the direction of arrow 44 toward the left end 26 and the sand wedge 28. Loose sand 38 used was ground down to grain size of approximately ⅛ that of normal beach sand.

Table I herebelow summarizes the spacing which was utilized between each of the tested samples there listed. Note that the number in parenthesis corresponds to FIGS. 2, 5, 8 and 11 respectively. These samples were deployed on the bottom of the tank spaced transversely along 32 estimated to be the line of cresting of each wave 42. The spacing ratio is the ratio of the height or thickness of each sample to the lateral spacing therebetween.

The average results of several tests of each sample are shown in FIGS. 13 through 16. In general, the hatched areas represent the areas, including the beach wedge 28, which were ultimately covered with loose sand 38 at the end of the test period. The areas marked with an "*", highlighted by surrounding them by borders, represent sand remaining on the bottom of the tank. The blank areas indicate the bare bottom 36 of the tank 24 which was completely uncovered and free of loose sand after the test period.

Referring particularly to FIG. 13 wherein the large oval configuration 10 was tested, at least a portion of the compacted sand wedge 28 was covered by loose sand 38 and very little loose sand 40 remained over substantially half of the flat area of the tank bottom 36. These results indicate that the large oval 10 was quite effective in converting the destructive wave formation 42 into constructive wave energy which washed a significant portion of the loose sand 40 at 42 onto and immediately adjacent the beach wedge 28.

Referring to FIGS. 14 to 16, these schematic representations of average test results clearly indicate the diminishing but significant beneficial effects of utilization of the small oval 12 (FIG. 14), the drop or pin shape samples 14 (FIG. 15) and the floating buoy arrangements 16 (FIG. 16).

EXPERIMENTAL OCEAN EROSION TEST RESULTS

Carrying the findings of the laboratory tests above summarized one step further, full scale samples were fabricated generally in the configuration of a large oval. These test samples were prepared for the general purpose of determining the rate of water and sand erosion thereof over a relatively short time period. Referring to Table II herebelow, four separate samples were prepared and used in two separate tests of each. Sample 1 was fabricated of concrete provided under the trade name Sakrete Sand Mix. However, in general terms, concrete samples were fabricated of Portland cement, sand and gravel in typically well-known proportions. More specifically, the Sakrete sand mix is commercially available having portland cement (Type I) and mason sand present in ratios of about 33 percent (33%) to sixty-seven percent (67%) by weight, respectively. Mason sand is generally defined as sand comprised of no larger than ⅛" in diameter. Sample 1 was fabricated only of Sakrete and water in the proportions indicated. Samples 2 through 4 were fabricated with increased amounts of water and beach sand as indicated.

Table II thus summarizes the rate of erosion in terms of percentage loss in weight as measured in two day intervals. The samples were submerged in the surf parallel to the shoreline along the estimated line of wave cresting. The sample sizes in their original form were all approximately 30 cm in diameter by 36 cm long, again of the generally large oval configuration and spaced approximately 5 meters apart.

In summary of Table II, then, the utilization of Sakrete alone produced no erosion whatsoever during the six day test period. However, by increasing the proportion of beach sand in the mixture, rapidly increasing rates of erosion were effected over the six day test period.

Table III is provided to show the sample composition of each sample by weight, listing portland cement, mason sand, beach sand and water as individual elements in each sample tested by weight and as a percentage of total composition.

Note that in testing sample 1 which showed no signs of erosion whatsoever, this sample began to become buried in the surrounding sand, indicating that the useful life of these devices generally in effecting destructive wave modification becomes limited in time by the length of time required for destructive wave formations to either erode or to bury the devices placed there for this purpose.

TABLE I
LABORATORY TEST

| Laboratory Sample | Spacing Ratio (height:spacing) |
| --- | --- |
| Large Oval (10) 3.0 cm × 4.0 cm | 1:1.6 |
| Small Oval (12) 2.4 cm × 3.6 cm | 1:1.75 |
| Pin (drop) Shape (14) 3.0 cm × 8.7 cm | 1:1.38 |
| Buoy (Styrofoam) (16) 2.0 cm dia. | 1:1.56 |

TABLE II
OCEAN EROSION TEST

| | Sample | Avg. % erosion (2 tests) | | |
| --- | --- | --- | --- | --- |
| | | Day 2 | Day 4 | Day 6 |
| #1 | 20.4 kg. Sakrete .156 kg. water | 0 | 0 | 0 |
| #2 | 20.4 kg. Sakrete .156 kg. water 5.0 kg. beach sand | 51.0 | 59.3 | 74.6 |
| #3 | 20.4 kg. Sakrete .2 kg. water 8.0 kg. beach sand | 63.5 | 95.5 | 92.1 |
| #4 | 20.4 kg. Sakrete | 72.8 | 93.6 | 97.9 |

TABLE II-continued
OCEAN EROSION TEST

| Sample | Avg. % erosion (2 tests) | | |
|---|---|---|---|
| | Day 2 | Day 4 | Day 6 |
| .24 kg. water 9.5 kg. beach sand | | | |

TABLE III
SAMPLE COMPOSITION

| Sample | Total weight (kg.) | Portland Cement (type I) wt. (kg) | % | Mason Sand wt. (kg) | % | Beach Sand wt. (kg) | % | Water wt. (kg) | % |
|---|---|---|---|---|---|---|---|---|---|
| #1 | 20.56 | 6.8 | 33.1 | 13.6 | 66.1 | 0 | 0 | .156 | 0.8 |
| #2 | 25.56 | 6.8 | 26.6 | 13.6 | 53.2 | 5.0 | 19.6 | .156 | 0.6 |
| #3 | 28.60 | 6.8 | 23.8 | 13.6 | 47.6 | 8.0 | 28.0 | .2 | 0.7 |
| #4 | 30.14 | 6.8 | 22.6 | 13.6 | 45.1 | 9.5 | 31.5 | .24 | 0.8 |

SUMMARY

Although all of the previously discussed shapes, including the buoy arrangement, all produced varying but significant effects of modification of destructive wave energies into constructive wave energies wherein sand was deposited toward the shore and atop the existing compacted beach sand, the large oval configuration has, indeed, shown to be most effective. Further, it being one of the objects of this invention to provide a beach erosion system which will not only provide the intended beach replenishment but will also avoid contamination of the beach area with remaining debris, the large oval structure which is fabricated to be worn away or eroded by wave action is preferred. Of course, the buoy system may be easily retrieved by boat for redeployment when later required.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A beach erosion reversal system structured to at least partially reform cresting destructive wave formations into constructive wave formations comprising:
    a plurality of solid three-dimensional members deployable by submersion offshore along a beach atop its bottom surface;
    each said solid member structured to be worn away by wave action along the beach in a predetermined length of time whereby substantially all of said solid member is eroded away leaving no solid member debris;
    each said solid member also structured to substantially alter destructive wave action to form constructive waves when deployed whereby submerged beach sand in the near vicinity of each said solid member is carried by the reformed wave formations toward the beach;
    said solid members constructed of portland cement and sand; said sand present in amounts greater than sixty-seven percent (67%) by weight.

2. A beach erosion reversal system as set forth in claim 1, wherein:
    said solid members are oval.

3. A beach erosion reversal system as set forth in claim 1, wherein:
    said solid members are spherical.

4. A beach erosion reversal system as set forth in claim 1, herein:
    said solid members are pin-shaped.

5. A beach erosion reversal system as set forth in claim 1, wherein:
    said portland cement ranges from about 22 to 33 percent by weight;
    said sand ranges from about 67 to 78 percent by weight of said mixture.

6. A beach erosion reversal system as set forth in claim 1,
    lateral spacing between each of said plurality of solid members is in the range of 1:1 to 1:5 with respect to the height of each said solid member.

7. A beach erosion reversal system as set forth in claim 1, wherein:
    positioning of said offshore submersion deployment of said plurality of solid members is along the line of wave crest formation.

8. A beach erosion reversal system as set forth in claim 1, wherein:
    the ratio of height of said plurality of solid members to the wave height is in the range of 1:2 to 1:4.

9. A beach erosion reversal system as set forth in claim 8, wherein:
    the ratio of height of said plurality of solid members to the wave height is equal to 1:2.5.

* * * * *

UNITED STATES PATENT AND TRADEMARK OFFICE
CERTIFICATE OF CORRECTION

PATENT NO. : 4,844,654

DATED : July 4, 1989

INVENTOR(S) : Mark Widerman

It is certified that error appears in the above-identified patent and that said Letters Patent is hereby corrected as shown below:

Col. 8, line 29, "herein" should read --wherein--.

Col. 8, line 38, after claim 1, insert --wherein--.

Signed and Sealed this

Nineteenth Day of June, 1990

Attest:

HARRY F. MANBECK, JR.

*Attesting Officer*  *Commissioner of Patents and Trademarks*